(12) United States Patent
Frenken et al.

(10) Patent No.: US 10,821,593 B2
(45) Date of Patent: Nov. 3, 2020

(54) HYDRAULICALLY ACTUATED PISTON GUIDED IN A CYLINDER, AND HYDRAULIC WORKING TOOL

(71) Applicant: GUSTAV KLAUKE GMBH, Remscheid (DE)

(72) Inventors: Egbert Frenken, Heinsberg (DE); Andreas Lehr, Neuss (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 287 days.

(21) Appl. No.: 15/772,588

(22) PCT Filed: Nov. 2, 2016

(86) PCT No.: PCT/EP2016/076365
§ 371 (c)(1),
(2) Date: May 1, 2018

(87) PCT Pub. No.: WO2017/080877
PCT Pub. Date: May 18, 2017

(65) Prior Publication Data
US 2018/0319000 A1   Nov. 8, 2018

(30) Foreign Application Priority Data
Nov. 10, 2015 (DE) .......... 10 2015 119 372

(51) Int. Cl.
*B25F 5/00* (2006.01)
*F15B 15/14* (2006.01)
(Continued)

(52) U.S. Cl.
CPC .............. *B25F 5/005* (2013.01); *B25B 27/10* (2013.01); *F15B 15/1447* (2013.01);
(Continued)

(58) Field of Classification Search
CPC ....... B25F 5/005; B25B 27/10; B25B 27/026; F15B 15/1447; F15B 15/204; F15B 51/22;
(Continued)

(56) References Cited

U.S. PATENT DOCUMENTS 7,412,868 B2 *   8/2008  Frenken ................. B25B 27/10
                                                     60/477
2002/0166446 A1 * 11/2002 Chen ....................... F01B 11/02
                                                     92/85 B
2007/0214860 A1   9/2007  Frenken

FOREIGN PATENT DOCUMENTS

DE    10 2006 002 309    7/2007
WO       2003/084719    10/2003

OTHER PUBLICATIONS

International Search Report for corresponding International Patent Application No. PCT/EP2016/076365 dated Feb. 27, 2017, 4 pages.
(Continued)

*Primary Examiner* — Michelle Lopez
(74) *Attorney, Agent, or Firm* — Klintworth & Rozenblat IP LLP

(57) ABSTRACT

The invention relates to a hydraulically actuated piston (9) guided in a cylinder (8), and to a hydraulic working tool (1) having a working head (2), wherein the piston (9) has an impact surface (15) which borders an impact space (16) on the piston side provided between the piston (9) and the cylinder (8), and wherein hydraulic fluid (17) can act on the impact surface (15) by increasing the impact space (16) in order to move the piston (9) in an impact direction (r), and the piston (9) forms a limiting device (25) for a through-flow of the hydraulic fluid (17). According to the invention, in order to design a hydraulic piston guided in a cylinder or a hydraulic working tool in such a way that no undue signs of wear occur even during working processes with the sudden
(Continued)

disappearance of the counter pressure, a hydraulic chamber (19) filled with the hydraulic fluid (17) is formed in the impact direction (r) after the limiting device (25), wherein a volume of the hydraulic chamber (19) is reduced according to the increase in the impact space (16), by means of the displacement of hydraulic fluid (17) out of the hydraulic chamber (19) and into the impact space (16) via the limiting device (25).

17 Claims, 7 Drawing Sheets

(51) Int. Cl.
| | |
|---|---|
| *F15B 15/20* | (2006.01) |
| *B25B 27/10* | (2006.01) |
| *B25B 27/02* | (2006.01) |
| *F15B 15/22* | (2006.01) |
| *B23D 29/00* | (2006.01) |
| *B26F 1/34* | (2006.01) |

(52) U.S. Cl.
CPC ............ *F15B 15/204* (2013.01); *F15B 15/22* (2013.01); *F15B 15/225* (2013.01); *F15B 15/226* (2013.01); *B23D 29/002* (2013.01); *B25B 27/026* (2013.01); *B26F 1/34* (2013.01); *F15B 2211/7052* (2013.01); *F15B 2211/755* (2013.01)

(58) Field of Classification Search
CPC .................. F15B 15/225; F15B 15/226; F15B 2211/7052; F15B 2211/755; B23D 29/002
USPC ........................................................ 173/218
See application file for complete search history.

(56) References Cited

OTHER PUBLICATIONS

Machine translation of DE 10 2006 002 309.
Written Opinion for corresponding International Patent Application No. PCT/EP2016/076365 dated Feb. 27, 2017, 5 pages.

* cited by examiner

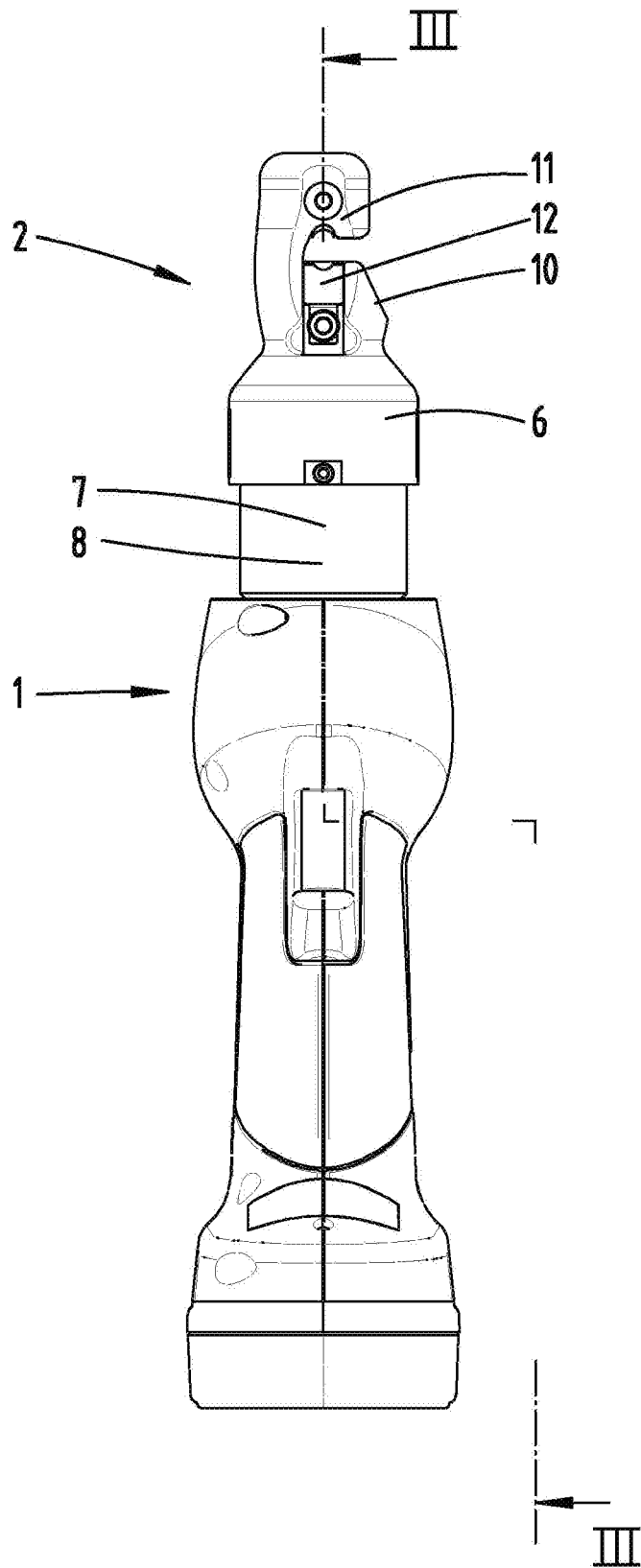
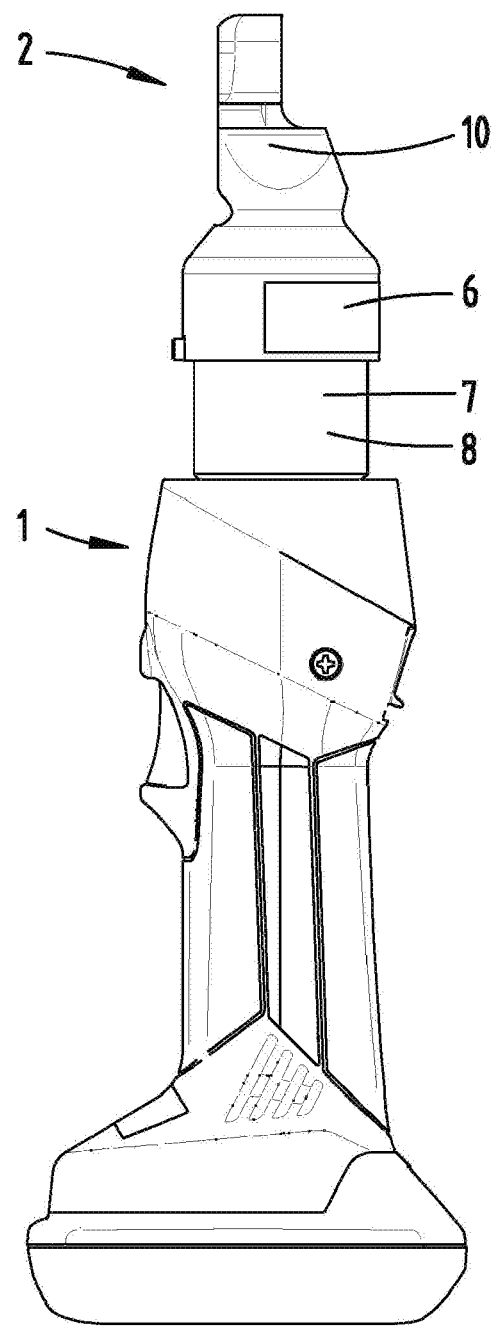

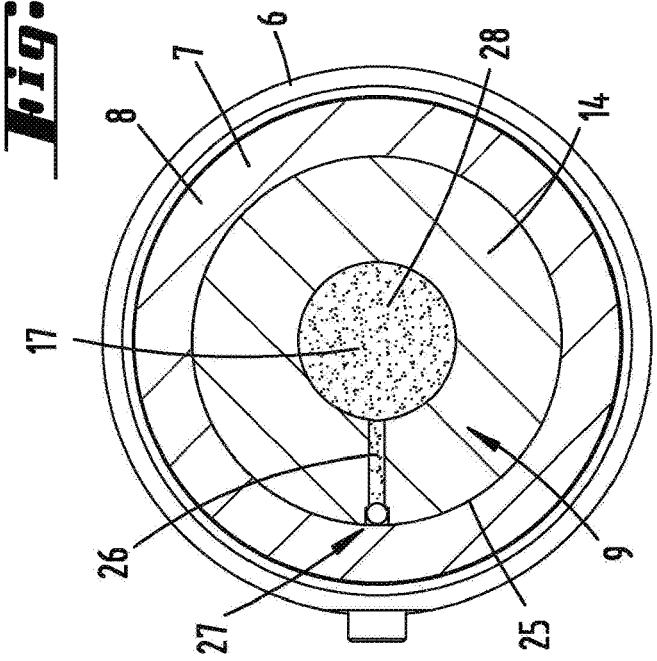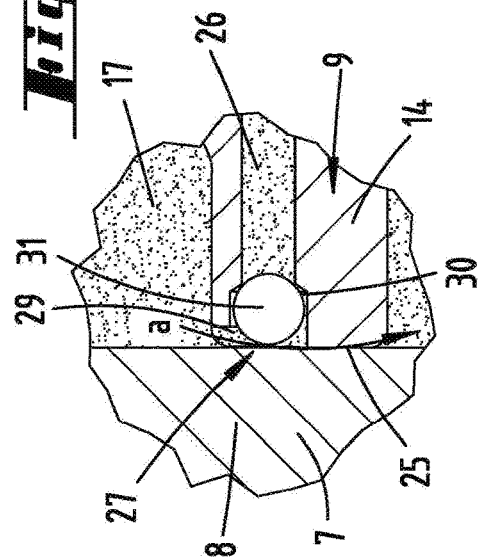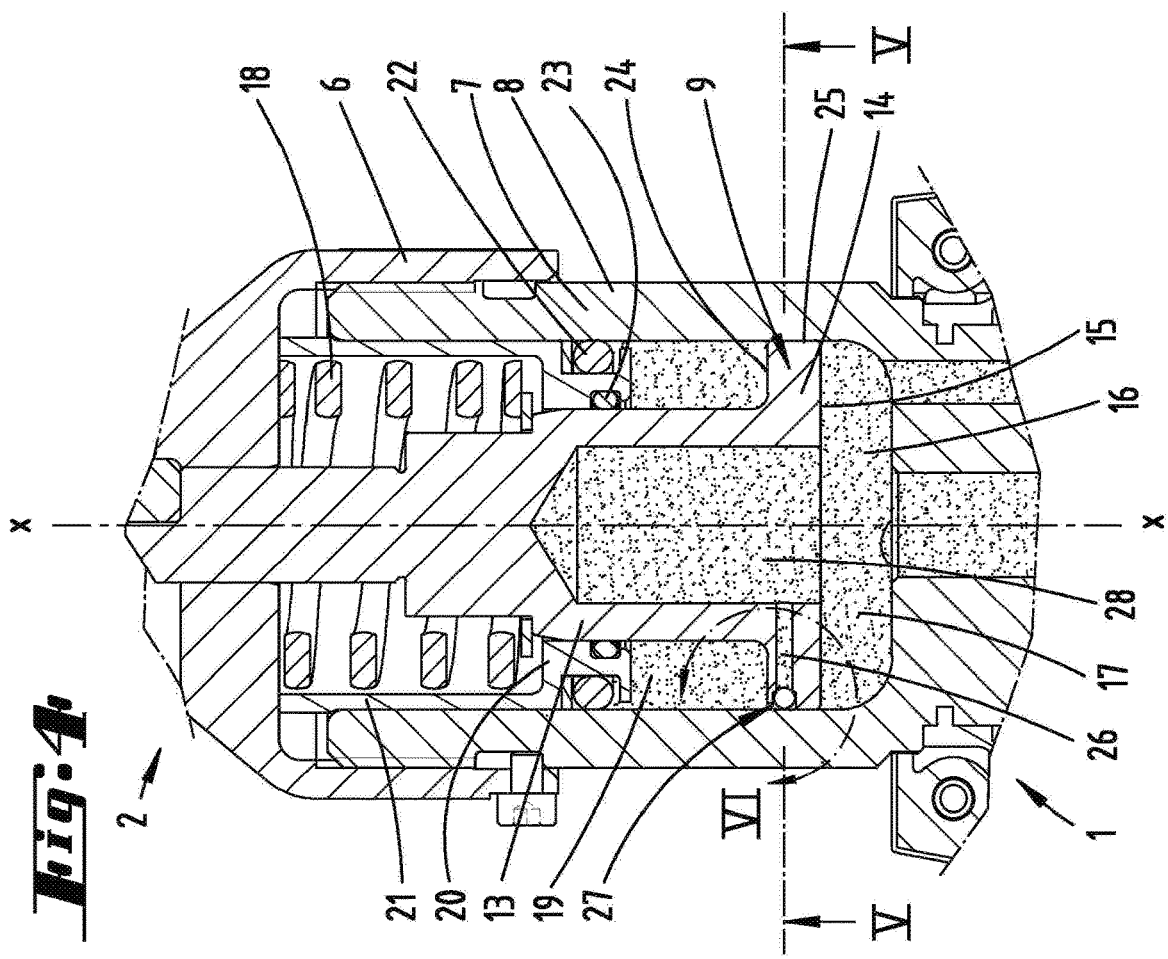

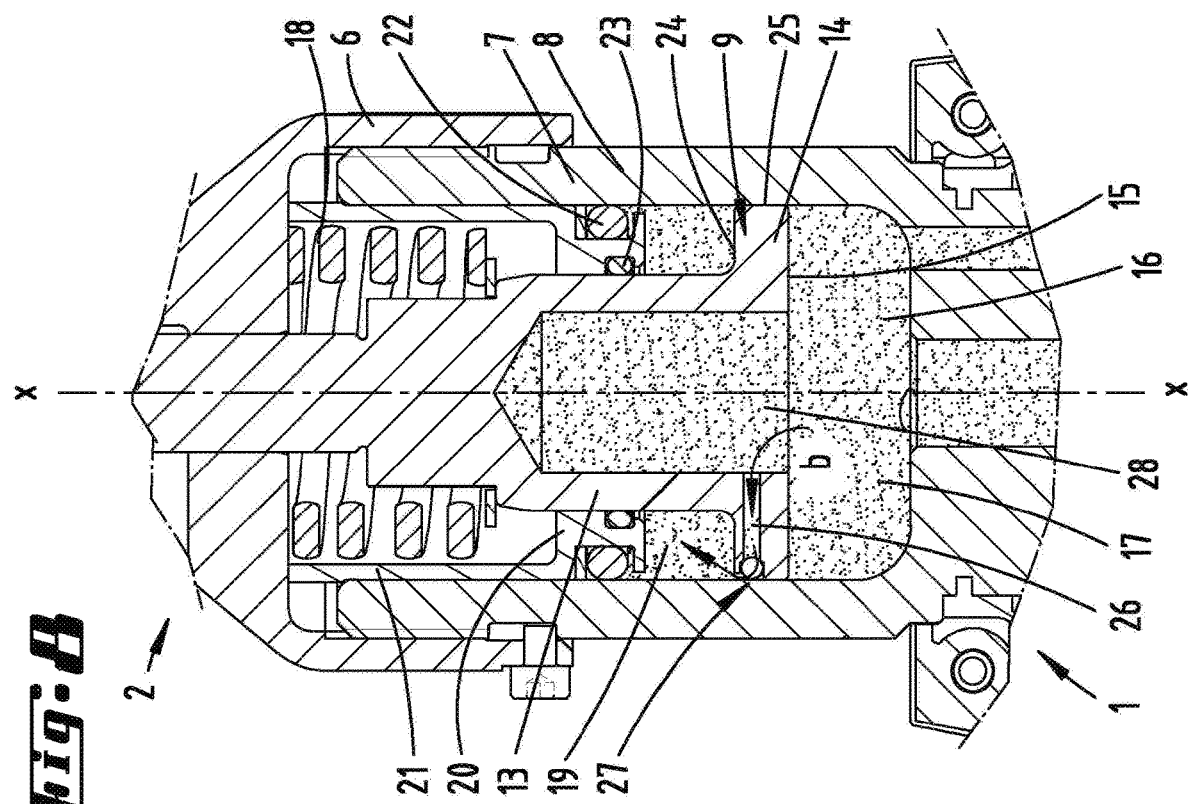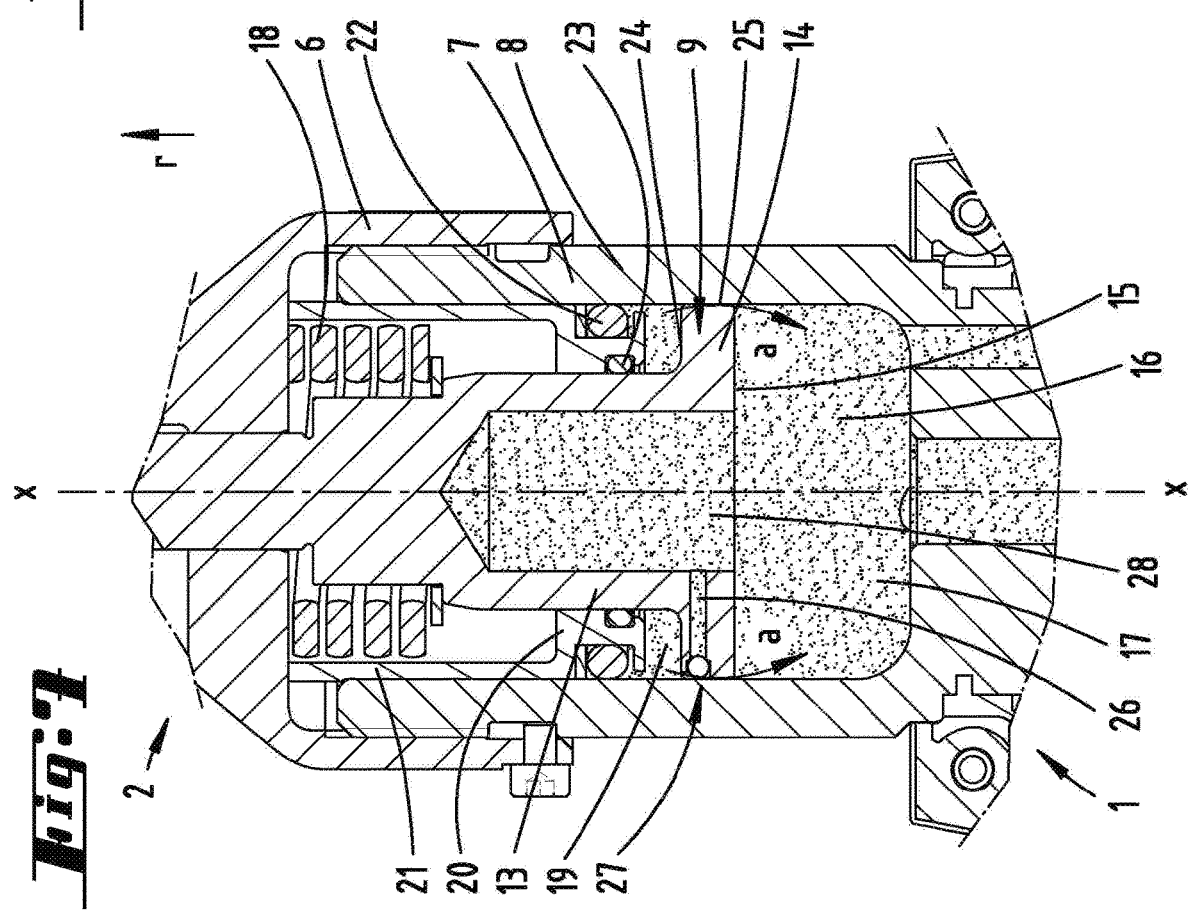

HYDRAULICALLY ACTUATED PISTON GUIDED IN A CYLINDER, AND HYDRAULIC WORKING TOOL

AREA OF TECHNOLOGY

The invention initially relates to a hydraulically actuated piston guided in a cylinder, wherein the piston has an impact surface that borders an impact space on the piston side provided between the piston and cylinder, wherein hydraulic fluid can further act on the impact surface by enlarging the impact space in order to move the piston in an impact direction, and the piston interacts with an inner surface of the cylinder to form a limiting device for the hydraulic fluid to flow through.

The invention also relates to a hydraulic working tool with a working head and a hydraulically actuated piston guided in a cylinder, wherein the piston has an impact surface that borders an impact space on the piston side provided between the piston and cylinder, wherein hydraulic fluid can further act on the impact surface by enlarging the impact space in order to move the piston in an impact direction, and the piston interacts with an inner surface of the cylinder to form a limiting device for the hydraulic fluid to flow through.

PRIOR ART

Hydraulically actuated pistons guided in a cylinder and hydraulic working tools of the kind in question are known. For example, reference is here made to WO 2003/084719 A2 (U.S. Pat. No. 7,412,868 B2). Such hydraulic working tools with hydraulically actuated pistons guided in a cylinder are used for cutting comparatively thick wires or punching or cutting metal sheets, for example. Triggered by a counter-pressure applied by a cutting or punching tool, the hydraulic medium can generate a pressure of 300 bar and more, for example all the way up to 600 bar or 800 bar, in the impact space. The counter-pressure results in a counter-force, since the counter-pressure is allocated to a respective specific surface.

For example, when cutting comparatively thick wires, for example wires with a diameter of 5.6 or 8 mm, which further can consist of a steel material that is tends to undergo brittle fractures under pressure, there can be a sudden drop in the counter-force given such an exemplary brittle fracture of the wire to be cut, so that the piston experiences a very strong acceleration in a very short period of time. As a result, very significant reaction forces can in turn arise in the device, since the piston as a rule immediately again experiences a correspondingly strong deceleration. During such an uncontrolled acceleration of the piston being exposed to a pressure of 600 bar, for example, at the moment of the brittle fracture, G-forces, for example G-forces measuring in excess of 1,000 all the way to several thousand, can be reached. As a result, severe wear and tear can arise in the device after a few uses of this kind.

SUMMARY OF THE INVENTION

In view of the known prior art, the object of the invention is to design a hydraulic piston guided in a cylinder or a hydraulic working tool in such a way that no excess wear and tear arises even during operations with a sudden elimination of the counter-pressure.

In a first inventive idea with respect to both a hydraulically actuated piston guided in a cylinder and to a hydraulic working tool, one possible solution to the object involves forming a hydraulic chamber filled with the hydraulic fluid in the impact direction after the limiting device, wherein a volume of the hydraulic chamber diminishes based on the enlargement of the impact space, forcing hydraulic fluid out of the hydraulic chamber via the limiting device into the impact space.

As a result of the proposed configuration, the piston is (also) hydraulically damped in the impact direction. The hydraulic chamber is preferably filled with the same hydraulic fluid with which the impact space is filled as well. As the piston is displaced in the impact direction, the hydraulic fluid flowing into the impact space—e.g., conveyed by a pump—enlarges the impact space formed in the impact direction in front of the piston surface, accompanied by a corresponding linear displacement of the piston in the impact direction. The downstream hydraulic chamber simultaneously becomes smaller as the pressurized hydraulic fluid in this hydraulic chamber is successively forced out. The hydraulic pressure prevailing in the hydraulic chamber depends directly on the hydraulic pressure prevailing in the impact space and acting on the piston in the impact direction. The hydraulic fluid forced out of the hydraulic chamber can be partially or completely forced into the impact space while passing through the limiting device. As the hydraulic piston returns, the hydraulic chamber enlarges again, wherein hydraulic fluid flows into the hydraulic chamber again in the reverse direction, possibly also through the limiting device. As the impact space is enlarged by hydraulic fluid being introduced into the impact space in a pumping operation, hydraulic fluid being forced out of the hydraulic chamber is simultaneously introduced into the impact space.

The limiting device can take the form of interacting surfaces of the piston and cylinder that leave a gap or opening. It can also take the form of a flow-through opening provided only in the piston, for example. Hydraulic fluid is preferably forced out of the hydraulic chamber into the impact space only by way of the limiting device. To this end, the limiting device can in the simplest case have a specifically provided leak. This leak can be selected in such a way that hydraulic fluid is only forced out of the hydraulic chamber into the impact space—and possibly also in the opposite direction as the piston returns—only starting at a prescribed pressure or starting at a prescribed pressure difference between the hydraulic chamber and impact space.

Given a sudden elimination of counter-force during an operational displacement of the piston, e.g., for cutting a wire or punching a metal sheet or the like, for example as the result of a brittle fracture of the material to be cut or punched, the piston can no longer or only very slightly "shoot forward" in the impact direction, since the piston is decelerated in the downstream hydraulic chamber by the hydraulic medium. In particular, the piston is damped in the impact direction. If a hydraulic fluid, in particular a hydraulic oil, is virtually incompressible at the usual pressures of up to about 100 or 200 bar, compression does take place at higher pressures, leading to a force correspondingly stored in the hydraulic medium. This can also result in a favorable cushioning effect against a sudden piston movement in the embodiment described here.

The leak in the area of the limiting device between the piston and cylinder can already take the form of a suitable clearance fit. Additionally or alternatively, a flattened region can also be provided in a partial area of a circumferential surface of the piston that interacts with an inner surface of the cylinder. For example, this flattened region can be provided in relation to a circular cross section of a piston flange, given a continuous circular surface of the cylinder. This yields a corresponding flow-through opening.

Further, one or more zones with a specific leak can be provided over the circumference of the piston (in the area of the limiting device or to form it). Apart from these zones, zones sealed in the usual manner can be formed in the area of the limiting device or to form it.

In a preferred embodiment, the piston or a piston flange or piston head possibly interacting with the inner surface of the cylinder is actuated bilaterally over the entire possible displacement range of the piston, i.e., in the impact direction in front and back of the piston or piston head, by a hydraulic fluid preferably originating from a common reservoir.

As a result of the proposed hydraulic damping with the formation of a hydraulic chamber after the limiting device, the subsequent high pressure values known for hydraulic working tools without such a device given a sudden easing are reduced to such an extent by comparison that the service life of the working tool is distinctly increased during use under the mentioned critical conditions. Excess wear and tear is not encountered.

The hydraulic chamber is preferably always virtually completely filled with hydraulic fluid in every position. In particular, the hydraulic chamber can have a smaller effective surface than the impact surface in relation to a force acting on the piston in or opposite the direction of movement. Derived from a pumping operation that increasingly fills the impact space with hydraulic fluid, more hydraulic fluid is concurrently forced out of the hydraulic chamber into the impact space. As preferred, given different surfaces, a higher pressure than in the impact space here always prevails in the hydraulic fluid located in the hydraulic chamber as the piston moves for performing an operation due to the hydraulically active surface ratios, at least as long as not opposed by any notable counter-force. At any rate, the pressure in the hydraulic chamber is higher than the pressure in the impact space by a pressure drop that arises in the impact space, as viewed from the hydraulic chamber toward the impact space.

Alternatively, the hydraulic chamber can also evacuate hydraulic fluid by way of a limiting device while the piston moves into a separate tank or directly into a common tank, from which the hydraulic fluid is also conveyed into the impact space. In such an embodiment, a lower pressure can arise in the hydraulic chamber—relative to the pressure prevailing in the impact space—even up to the time that the counter-force is eliminated (independent of a surface ratio between the effective surface of the hydraulic chamber and impact surface).

In any event, it is essential that the limiting device generate a high enough throttling effect that virtually no relevant flow through the limiting device can be present given a sudden elimination of the counter-force at this moment in time. As a result, a pressure rise caused by the inertial force of the piston owing to the elimination is virtually absorbed at this moment in a volume of the hydraulic chamber that is constant in relation to this moment by a generated high stress, i.e., a pressure rise, of the hydraulic fluid in the hydraulic chamber.

No special arrangements are preferably made with regard to the combination of piston and cylinder or the hydraulic working tool that would enable a delivery of hydraulic fluid in the hydraulic chamber for performing an operation of the piston in the direction opposite to the impact direction. Filling the hydraulic chamber preferably involves evacuating the impact space or returning the piston to its initial position.

Additional features of the invention are explained below, to include in the description to the figures, often in their preferred allocation to the subject matter of claim 1 and/or claim 2, or to features of additional claims. However, they can also be important as allocated to just individual features of claim 1 and/or claim 2 or of the respective additional claim, or even each separately.

One possible embodiment provides that the hydraulic chamber have a filler valve, which is open when the piston is moved opposite the impact direction. In a preferred embodiment, the filler valve can open automatically, depending on the pressure. In this regard, the valve can also be made to open manually or semi-manually by the user.

While a piston is being displaced back toward the initial position, hydraulic fluid can be forced out of the impact space into the hydraulic chamber via the opened filler valve. The partial quantity of hydraulic fluid present in the hydraulic chamber with the piston completely returned can thus be a portion of the quantity of hydraulic fluid forced out of the impact space by the return displacement of the piston. The excess portion of hydraulic fluid that was not pushed forward into the hydraulic chamber is preferably forced into a supply tank of the hydraulically operated tool in a known manner.

However, the hydraulic chamber can also be refilled from a separate tank, e.g., through siphoning, while the piston returns. The separate tank can also have leading to it a separate check valve, which is closed while performing an operation, but enables a favorable filling of the hydraulic chamber from the separate tank, possibly even from the shared tank, while the piston returns. This type of filling can also be assisted by a certain pressure, for example an elastic pressure, which acts on the separate tank or its content.

If the hydraulic fluid is not delivered while the piston moves in the impact direction, it is correspondingly preferably provided that the piston be sealed relative to the cylinder in a usual manner, for example by separate O-rings or metal piston rings, so that there is no difference in comparison to a conventionally arranged piston in a cylinder in a working tool designed in this manner.

The valve can be a check valve, for example a ball valve.

As already more generally explained, the selected ratio between the surfaces of the hydraulic chamber and impact space active in the impact direction can be such that a higher pressure, for example 1.5, 2 or 3 times up to 5 times or more pressure, arises in the hydraulic chamber than in the impact space while the piston moves in the impact direction, so long as no relevant counter-pressure prevails, for example up to a counter-pressure of several bar, for example up to 10 or 20 bar.

The counter-force cited above and below is the force that must be applied by the piston as it begins and continues to contact the workpiece and possibly penetrate into the workpiece (also) based on the resistance of the workpiece. In this sense, the counter-force emanating from the workpiece is involved.

While the counter-force builds up during the execution of a cutting or punching procedure, for example, the ratio between the pressures in the impact space and hydraulic chamber tightens. If the hydraulic fluid is forced out of the hydraulic chamber by the limiting device only or virtually only into the impact space, the pressure in the hydraulic chamber will also still be higher by the arising differential pressure in the limiting device up until the moment the counter-force is suddenly drops. Given a sudden elimination of the counter-force, a very high force load arises in the hydraulic chamber in the impact direction due to the inertial force of the piston no longer exposed to the counter-force. In the hydraulic chamber, this results in a very highly stressed hydraulic fluid, which immediately thereafter can expand opposite the impact direction while acting on the piston. During expansion, the hydraulic fluid in the hydraulic chamber thus works in a direction opposite where the piston is still tending to move at this moment.

The pressure difference arising from the limiting device, which is thus caused by a corresponding throttling effect in the limiting device, can measure 20 to 70 bar, further 50 bar, for example. In addition, if the ratio between the active surfaces is 2:1, a pressure of a few bar, for example 2 to 5 bar over the pressure caused by the limiting device, arises in the impact space in an exemplary case as the piston moves forward when no significant counter-force yet prevails, e.g., 22-25 bar given 20 bar and 72-75 bar given 70 bar, while a pressure of approx. 40 bar (given a 20 bar pressure drop in the limiting device) or even approx. 140 bar given a 70 bar pressure drop in the limiting device arises in the hydraulic chamber. If contact is then made with a workpiece during an operation, i.e., a relevant counter-force builds up, possibly even for a very short time, the pressure in the impact space can rise up to 300 bar, for example, while it would rise in the hydraulic chamber up to approx. 350 bar in this example given the assumed 50 bar pressure drop in the limiting device. The various surfaces yield a corresponding difference in forces, in what force is then available as the operating force, e.g., for cutting. For example, the counter-force can suddenly be eliminated at a pressure in the impact space of 500 bar, wherein an expansion then causes the piston to correspondingly accelerate. As a result of the piston actuated in this way or its tendency to accelerate, the pressure in the hydraulic chamber can very suddenly increase significantly, e.g., example up to 700 bar or more in the mentioned example. A pressure difference of 300 bar or more between the hydraulic chamber and impact space hereby then results within such a period of time that must here be practically referred to as a point in time. Immediately thereafter, however, the pressures drop very quickly down to nearly zero or to zero in both chambers, the impact space and hydraulic chamber, when the piston comes to a stop. The mentioned processes run their course in very short periods of time, in milliseconds.

In terms of the disclosure, the ranges or multiple ranges indicated above and below also include all intermediate values, in particular 1/10 increments of the respective dimension, i.e., potentially dimensionless as well. For example, the indication up to 5 times also encompasses the disclosure of up to 4.9 times. This disclosure can serve to narrow a mentioned range limit from above or below on the one hand, but alternatively or additionally to disclose one or more singular values out of a respectively indicated range.

BRIEF DESCRIPTION OF THE DRAWINGS

The invention is explained below based on the attached drawing, which only shows an exemplary embodiment. The drawing shows:

FIG. 1 A hydraulic working tool with a hydraulically actuatable piston guided in a cylinder, in elevation;
FIG. 2 A side view of the working tool;
FIG. 4 A magnified view of area IV on FIG. 3 involving a base piston position;
FIG. 5 The section according to line V-V on FIG. 4;
FIG. 6 A magnified view of area VI on FIG. 4;
FIG. 7 An illustration corresponding to FIG. 4 while displacing the piston in the impact direction;
FIG. 8 Another illustration corresponding to FIG. 4 and relating to an intermediate position during the return of the piston.

DESCRIPTION OF THE EMBODIMENTS

Depicted and described initially with reference to FIG. 1 is a hydraulic, in particular electrohydraulic working tool 1 suitable for one-handed operation for actuating a working head 2. As shown, the working head 2 can be designed as a head that can be interchangeably mounted on the working tool 1. A head non-detachably joined with the tool is likewise possible. The working head 2 is designed as a cutting head in the exemplary embodiment shown. However, working heads 2 in the form of punching or pressing heads can also be arranged on the working tool 1, for example.

The working head 2 can be hooked up to the working tool 1 for hydraulic supply purposes.

Figure 3:
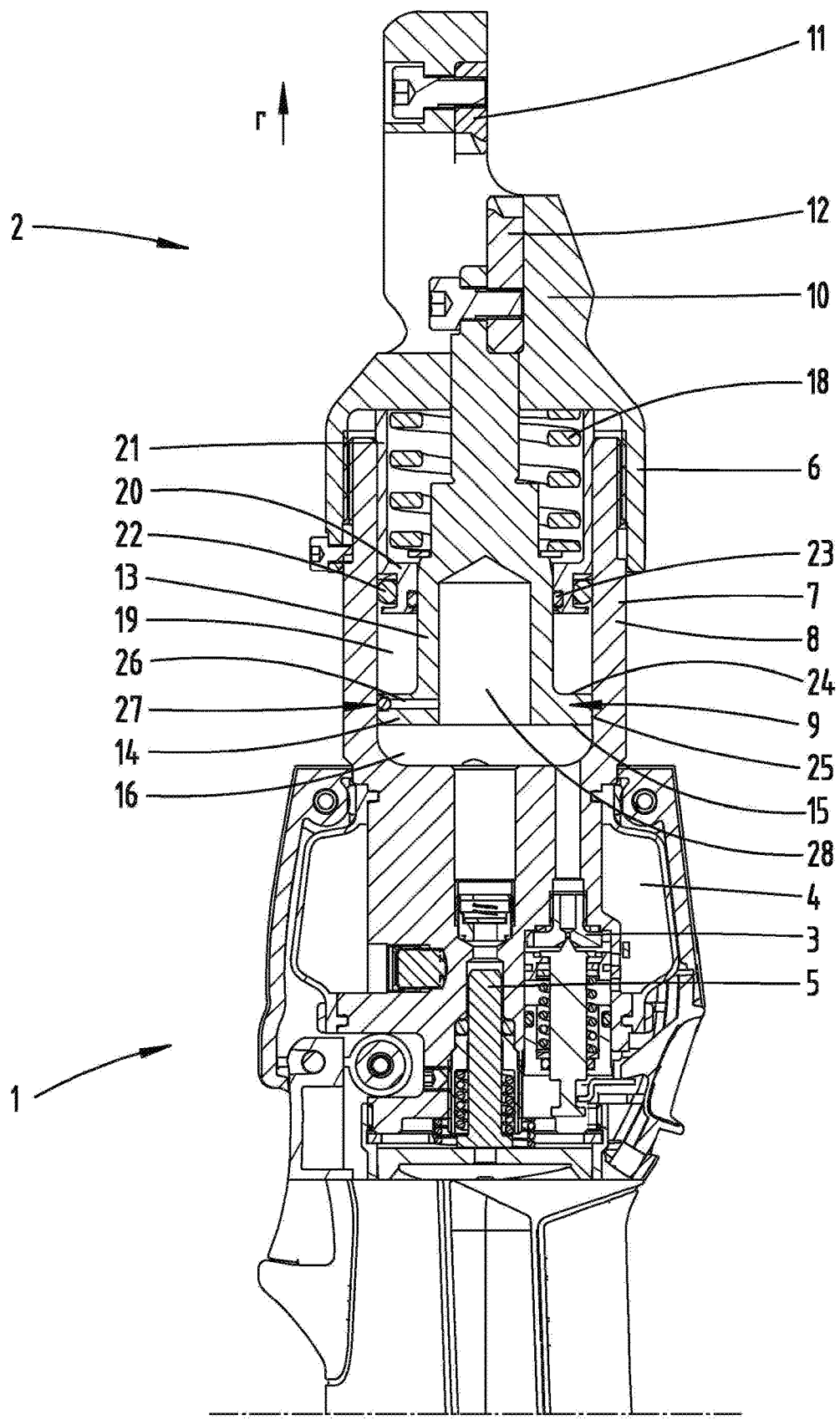
FIG. 3 The section according to line III-Ill on FIG. 1.

As also preferred, the hydraulic working tool 1 can be a base device of the kind also depicted and described in the WO 2003/084719 A2 (U.S. Pat. No. 7,412,868 B2) cited at the outset. With reference to the illustration on FIG. 3, the upper area of the working tool 1 reveals the link with the subject matter described in the mentioned WO publication, e.g., with respect to a return valve 3, a tank 4 and a pumping plunger 5. By way of further explaining the hydraulic working tool 1 preferably used here, reference is otherwise made to the mentioned WO or US publication in its entirety, also with the aim of including the purposes and features described in the WO or US publication with regard to the structural design of the working tool in the claims of the application.

The working head 2 is both mechanically and hydraulically joined with the working tool 1 by way of a flange 6. To this end, the flange 6 is initially designed to be screwed with a neck 7 of the working tool 1. The neck 7 simultaneously forms a cylinder 8 for a piston 9 of the working head 2. The area within which the working tool 1 and working head 2 interact is generally designed rotationally symmetrical to an x axis.

The flange 6 of the working head 2 encompasses the neck 7, and on the working head side of the neck 7 transitions into a retainer 10 with a bow-shaped design. A fixed blade 11 is arranged on this retainer 10 in the exemplary embodiment depicted.

Another movable blade 12 is arranged upstream toward the fixed blade 11. The blade 12 is coupled with the piston 9, which correspondingly is also a constituent of the working head 2.

The piston 9 and therefore the blade 12 can be linearly displaced in the working head 2, along the x axis in the use position.

The piston 9 has a piston shaft 13 with a plate-shaped piston flange or piston head 14 facing away from the working area or connection area of the blade 12 to the piston shaft 13.

The diameter of the piston head 14 is adjusted to the inner diameter of the receiving cylinder 8. The interacting surfaces of the piston 9 or piston head 14 and the cylinder 8 yield a limiting device 25.

The piston shaft diameter is diminished relative to the outer diameter of the piston head 14, and hence relative to the inner diameter of the cylinder 8, for example corresponding to 0.5 to 0.7 times the piston head diameter. This correspondingly results in an annular chamber enveloping the piston shaft 13.

The piston head 14 facing away from this annular chamber forms an impact surface 15 for the hydraulic fluid 17 conveyed in the impact space 16 formed between the cylinder 8 and piston 9 in front of the impact surface 15 during operation of the working tool 1.

The piston 9 is loaded against an impact direction r caused by a pressure increase in the impact space 16 toward a basic position, for example as depicted on FIG. 4. A spring 18 is provided for this purpose, in particular a cylinder compression spring. The spring 18 abuts against the working head 2 at one end in the area of the retainer 10, and acts on the piston shaft 13 at the other end.

The annular chamber that comes about radially between the piston shaft 13 and cylinder 8 forms a hydraulic chamber 19. The latter is bordered essentially by the piston head 14 opposite the impact direction r, and by a surface that is fixed relative to the cylinder 8 in the impact direction r. In the exemplary embodiment shown, the fixed surface is formed by a collar 20 of a sleeve 21 retained on the working head 2 that acts to seal the inner surface of the cylinder 8. The fixed surface could also be an integral part of the cylinder. The sleeve 21 can envelop the spring 18, and in the depicted position of the working head 2 connected to the working tool 1 preferably abuts the cylinder 8 on the interior side of the wall.

The area of the collar 20 continuously accommodates a seal 22 radially outwardly, so as to act as a seal against the inner cylinder surface. The collar 20 also has a seal 23 radially inwardly for interacting with the cylindrical outer surface of the piston shaft 13.

The hydraulic chamber 19 is thus sealed in the area of the collar 20 as viewed in the impact direction r. By contrast, preferably no or at least no completely continuous seal is provided in the direction of the piston head 14. Rather, a clearance fit is provided between the piston head 14 and inner surface of the cylinder 8, for example. This provides an intentional leak between the piston 9 and cylinder 8, and further between the hydraulic chamber 19 and impact space 16.

The hydraulic chamber 19 is filled with the same hydraulic fluid 17 as the impact space 16. Proceeding from a basic piston position according to FIG. 4 or a basic working head position according to the illustrations on FIGS. 1 to 3, the preferably electrically operated pump provided in the working tool 1 is actuated to pump hydraulic fluid 17 into the impact space 16. This causes a linear displacement of the piston 9 relative to the cylinder 8 inside of the cylinder 8 in the impact direction. The movement takes place opposite the force exerted by the spring 18, which in particular serves to restore the system to the basic position.

Due to the ratio between the effective surfaces of the impact space 16 (impact surface 15) and hydraulic chamber 19 (annular surface 24 of the piston head 14), a pressure elevated by comparison to the pressure in the impact space 16 arises in the hydraulic chamber 19 as the piston 9 advances as the result of pumping hydraulic fluid into the impact space 16. In any event, this hydraulic chamber pressure can measure 5 times, for example, and possibly even beyond that, of the impact space pressure, as long as no notable counter-pressure prevails.

The limiting device 25 preferably provided in the area where the piston 9 or piston head 14 interacts with an inner wall of the cylinder 8 has the kind of leak that allows hydraulic fluid 17 to be forced out of the hydraulic chamber 19 into the impact space 16 (also) as a result of the given pressure difference as the piston 9 moves in the impact direction r (see arrows a on FIG. 7). Accordingly, a volumetric enlargement of the impact space 16, and hence a piston displacement in the impact direction r, is accompanied by a volumetric reduction of the hydraulic chamber 19.

In a preferred embodiment, the size of the hydraulic chamber 19, in particular its axial measure in the direction of extension of the x axis, can be selected in such a way that the hydraulic chamber 19 still remains filled with a residual quantity of hydraulic fluid 17 with the piston 9 in a completely forwardly displaced position (which can also be limited by a stop).

Given a sudden forward displacement of the piston 9, i.e., during a cutting process in the exemplary embodiment shown, the partial hydraulic fluid quantity in the hydraulic chamber 19 damps the movement of the piston 9. In particular toward the end of the process of extending the piston 9 or given a high acting counter-force and a correspondingly high pressure in the impact space, which is often clearly present before the extension process has ended, a pressure roughly the same as in the impact space 16 elevated by about the pressure difference caused by the limiting device arises based on the prevailing counter-force in the hydraulic chamber 19 in the depicted exemplary embodiment. If the object to be cut breaks (brittle fracture) in such a position, in which 500 bar or more, for example 600 or 700 bar, act on the piston 9, the system is suddenly relieved, whereupon the piston 9 tends to push forward in the impact direction r. This is to be avoided by the hydraulic buffer in the hydraulic chamber 19. The hydraulic means in the hydraulic chamber 19 effectively decelerates the piston 9 over a very short path and in a very short time measuring fractions of a second. A very distinct, relevant further pressure rise in the hydraulic chamber 19 here takes place over the short term. As a result, the hydraulic fluid in the hydraulic chamber 19 can also be compressed, and thus absorb force as elastically as a spring, which immediately thereafter tries to press the piston in the opposite direction.

The return process of the piston 9 can be initiated automatically by the working tool 1, controlled by a valve, or alternatively in a manual operation. The return displacement is achieved by having the spring 18 act opposite the impact direction r, wherein the hydraulic fluid 17 located in the impact space 16 is forced back into the tank 4.

During this return displacement, the volume of the impact space 16 diminishes. At the same time, the volume of the hydraulic chamber 19 increases.

During the return displacement of the piston, hydraulic fluid 17 flows out of the impact space 16 into the hydraulic chamber 19 (see arrow b on FIG. 8). This can take place through the leak provided in the area of the limiting device 25.

To this end, a return flow channel 26 with a fill valve 27 is preferably provided.

As also depicted, the return flow channel 26 can be a radially directed branch channel, which empties radially outwardly in the area where the piston 9, in particular the piston head 14, and an inner surface of the cylinder 8 interact, for example in the area of the limiting device 25.

The return flow channel 26 can radially inwardly empty in the area of a central cavity 28 of the piston 9, wherein the cavity 28 is part of the impact space 16.

The branch channel-like return flow channel 26 empties radially outwardly in the area of the limiting device 25, for example, into a flow section 29 that opens toward the hydraulic chamber 19 and is essentially axially aligned. An area 30 expanded in relation to the return flow channel 26 is situated upstream from the flow section 29 in the direction of flow of the hydraulic fluid 17 during the return displacement of the piston 9. A valve ball 31 can be displaced therein in the direction of flow, so as to open the flow-through path for the hydraulic fluid 17 during the return displacement of the piston 9.

During a piston displacement in the impact direction r and given the corresponding overpressure here present in the hydraulic chamber 19, the valve ball 31 is forced into the closed position of the return flow channel 26.

Figure 9:
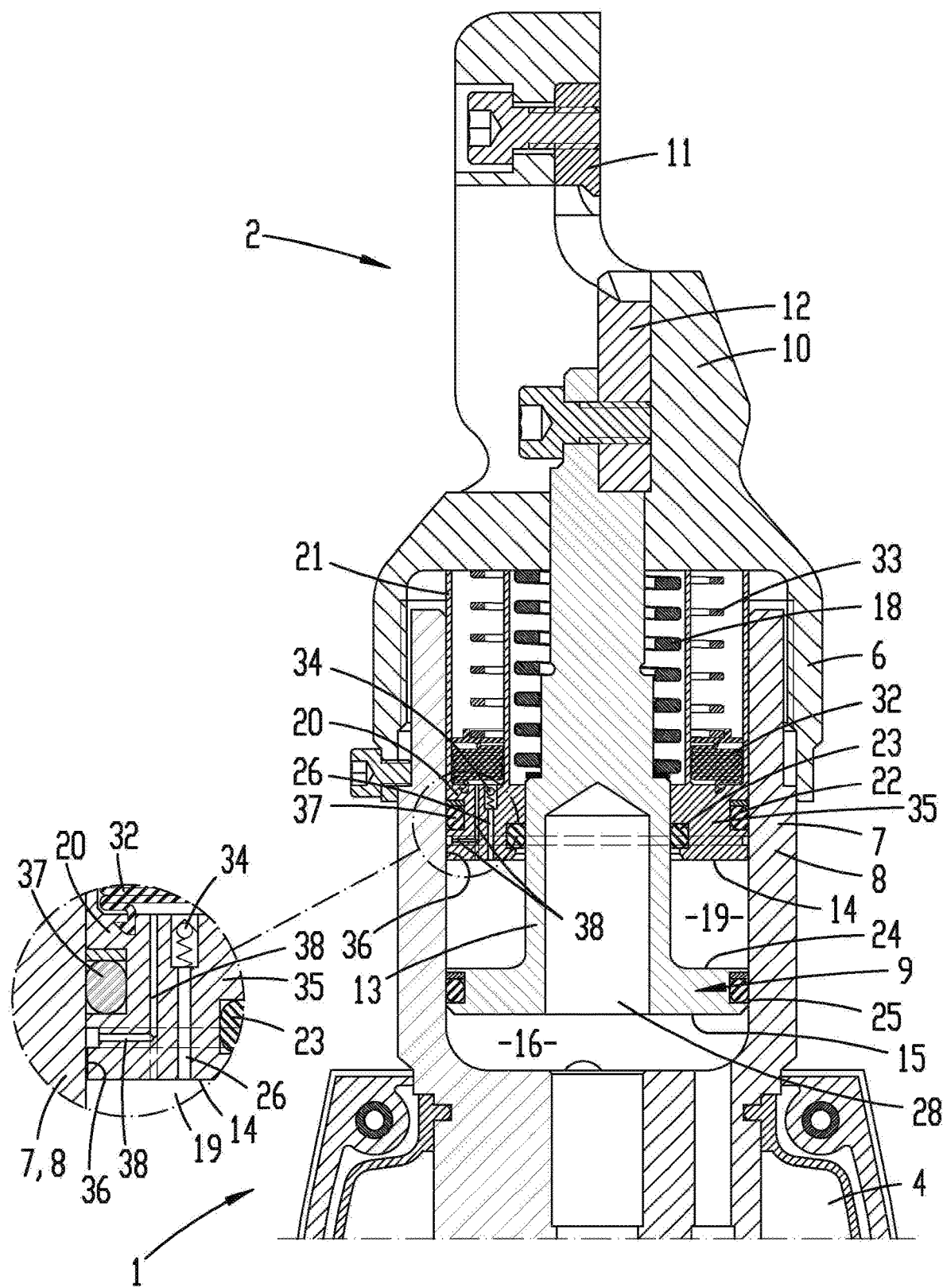
FIG. 9 An illustration according to FIG. 4 with a hydraulic chamber that can be evacuated into a separate reservoir.
Figure 10:
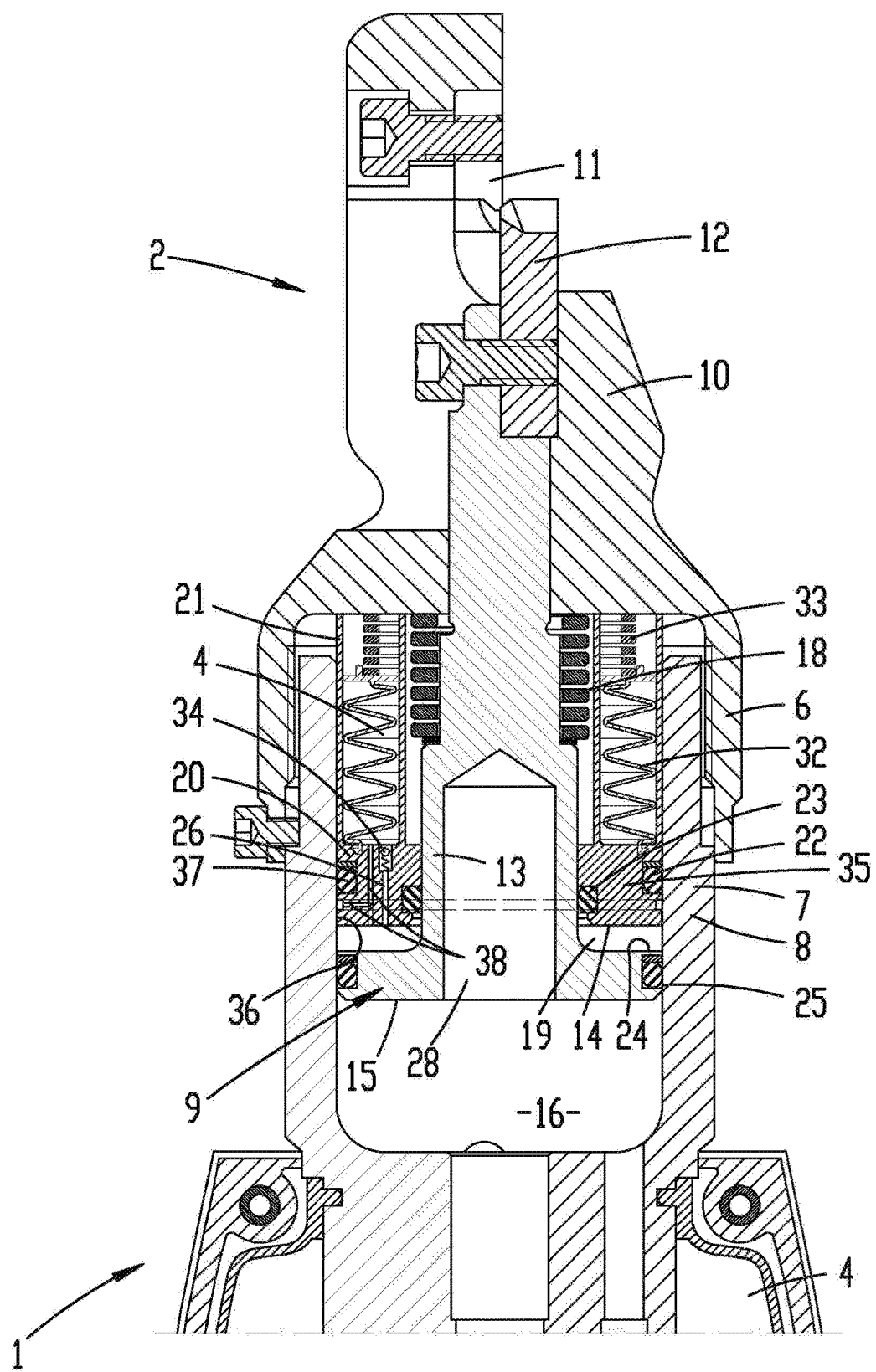
FIG. 10 An illustration of the embodiment on FIG. 9 with the piston advanced.
Figure 11:
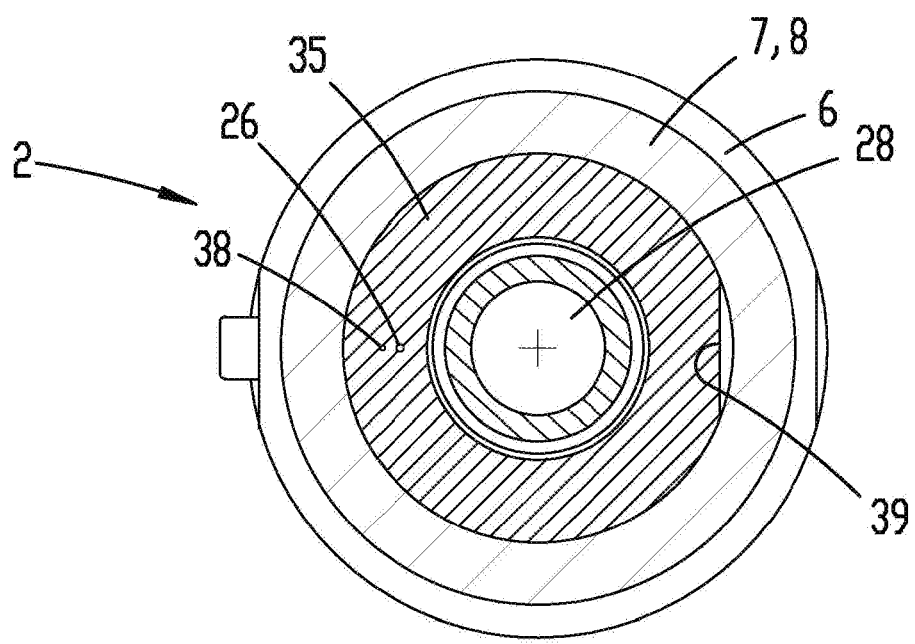
FIG. 11 An alternative embodiment of a leak between the piston and an inner cylinder surface.

FIGS. 9 and 10 show an embodiment in which the hydraulic fluid located in the hydraulic chamber is evacuated into a separate tank 4. In such a configuration, a lower pressure can be present in the hydraulic chamber until the counter-force is eliminated.

The limiting device can basically be designed as described above in this embodiment as well.

The separate tank 4' can be designed in a variety of ways. Strictly by way of example, the exemplary embodiment provides a bellows 32, which can expand against a return spring 33 acting on it while hydraulic fluid is being conveyed in the separate tank 4'.

After completion of an operation and a corresponding pressure drop in the impact space, the piston 9 travels back, wherein the return spring 33 causes the volume of hydraulic fluid previously accommodated in the separate tank 4' to again empty into the impact space, in the exemplary embodiment by way of a check valve 34.

In this embodiment, a fixed partition wall 35 in the cylinder 8 provides the transition to the separate tank 4'. The limiting device 25 can be formed between a radial lateral surface 36 of the partition wall 35 and the inner surface of the cylinder 8. As also evident from the magnified view on FIG. 9, it is solely provided by a leak between the allocated surfaces in the exemplary embodiment shown. Hydraulic fluid that flows through can then proceed in the direction of flow in front of a radial seal 37 and enter into a borehole 38, which provides access to the separate tank 34.

As shown in the schematic diagram on FIG. 10, the limiting device can also be formed, if necessary even only, by a flattened region 39 of the piston head or partition wall specifically formed at a circumferential area. Several such flattened regions 39 can also be provided around the circumference. In this way, the limiting device can be formed at one or several specific locations over the circumference in a targeted manner.

The flattened region shown on FIG. 10 is exaggeratedly large for the sake of clarity.

REFERENCE LIST

1 Working tool
2 Working head
3 Return valve
4 Tank
4' Separate tank
5 Pumping plunger
6 Flange
7 Neck
8 Cylinder
9 Piston
10 Retainer
11 Fixed blade
12 Blade
13 Piston shaft
14 Piston head
15 Impact surface
16 Impact space
17 Hydraulic fluid
18 Spring
19 Hydraulic chamber
20 Collar
21 Sleeve
22 Seal
23 Seal
24 Annular surface
25 Limiting device
26 Return flow channel
27 Fill valve
28 Cavity
29 Flow section
30 Expanded area
31 Valve ball
32 Bellows
33 Restoring spring
34 Check valve
35 Partition wall
36 Lateral surface
37 Radial seal
38 Borehole
39 Flattened region
a Arrow
b Arrow
r Impact direction
x Axis

The invention claimed is:

1. An assembly comprising:
a cylinder;
a hydraulically actuated piston in the cylinder, the piston having an impact surface and a limiting device which limits a through-flow of hydraulic fluid through the piston;
an impact space provided upstream of the limiting device between the impact surface of the piston and the cylinder, wherein hydraulic fluid can act on the impact surface to enlarge the impact space in order to move the piston in an impact direction; and
a hydraulic chamber filled with the hydraulic fluid is formed in the impact direction downstream of the limiting device, the hydraulic chamber having a fill valve which is open while the piston moves opposite to the impact direction,
wherein a volume of the hydraulic chamber diminishes based on the enlargement of the impact space, forcing hydraulic fluid out of the hydraulic chamber through the limiting device into the impact space.

2. The assembly of claim 1, wherein a ratio between areas of surfaces of the hydraulic chamber and the impact space in the impact direction is provided such that a higher pressure arises in the hydraulic chamber than in the impact space while the piston moves in the impact direction without any relevant counter-pressure on the piston.

3. The assembly of claim 2, wherein the piston interacts with an inner surface of the cylinder to form the impact space.

4. The assembly of claim 2, wherein the higher pressure is up to 5 times higher.

5. The assembly of claim 1, wherein the piston interacts with an inner surface of the cylinder to form the impact space.

6. An assembly comprising:
a cylinder;
a hydraulically actuated piston in the cylinder, the piston having an impact surface, a rear surface and a limiting device which limits a through-flow of hydraulic fluid through the piston between the rear surface and the impact surface;
an impact space provided upstream of the limiting device between the impact surface of the piston and the cylinder, wherein hydraulic fluid can act on the impact surface to enlarge the impact space in order to move the piston in an impact direction; and
a hydraulic chamber filled with the hydraulic fluid is formed in the impact direction downstream of the limiting device, wherein the hydraulic fluid in the hydraulic chamber acts on the rear surface of the piston,
wherein a volume of the hydraulic chamber diminishes based on the enlargement of the impact space, forcing hydraulic fluid out of the hydraulic chamber through the limiting device, wherein the limiting device a provides throttling such that the hydraulic chamber is quasi-closed when a counter-pressure on the piston is eliminated, and the hydraulic fluid in the hydraulic chamber is exposed to a pressure rise of the hydraulic fluid in the hydraulic chamber caused by movement of the piston.

7. The assembly of claim 6, wherein a ratio between areas of surfaces of the hydraulic chamber and the impact space in the impact direction is provided such that a higher pressure arises in the hydraulic chamber than in the impact space while the piston moves in the impact direction without any relevant counter-pressure on the piston.

8. The assembly of claim 7, wherein the piston interacts with an inner surface of the cylinder to form the impact space.

9. The assembly of claim 7, wherein the higher pressure is up to 5 times higher.

10. The assembly of claim 6, wherein the piston interacts with an inner surface of the cylinder to form the impact space.

11. The assembly of claim 6, wherein the hydraulic chamber has a fill valve which is open while the piston moves opposite to the impact direction.

12. A hydraulic working tool comprising:
a working head;
a cylinder attached to the working head;
a hydraulically actuated piston in the cylinder, the piston having an impact surface, a rear surface and a limiting device which limits a through-flow of hydraulic fluid through the piston between the rear surface and the impact surface;
an impact space provided upstream of the limiting device between the impact surface of the piston and the cylinder, wherein hydraulic fluid can act on the impact surface to enlarge the impact space in order to move the piston in an impact direction; and
a hydraulic chamber filled with the hydraulic fluid is formed in the impact direction downstream of the limiting device, wherein the hydraulic fluid in the hydraulic chamber acts on the rear surface of the piston,
wherein a volume of the hydraulic chamber diminishes based on the enlargement of the impact space, forcing hydraulic fluid out of the hydraulic chamber through the limiting device, wherein the limiting device provides throttling such that the hydraulic chamber is quasi-closed when a counter-pressure on the piston is eliminated, and the hydraulic fluid in the hydraulic chamber (is exposed to a pressure rise of the hydraulic fluid in the hydraulic chamber caused by movement of the piston.

13. The hydraulic working tool of claim 12, wherein a ratio between areas of surfaces of the hydraulic chamber and the impact space in the impact direction is provided such that a higher pressure arises in the hydraulic chamber than in the impact space while the piston moves in the impact direction without any relevant counter-pressure on the piston.

14. The hydraulic working tool of claim 13, wherein the piston interacts with an inner surface of the cylinder to form the impact space.

15. The hydraulic working tool of claim 13, wherein the higher pressure is up to 5 times higher.

16. The hydraulic working tool of claim 12, wherein the piston interacts with an inner surface of the cylinder to form the impact space.

17. The hydraulic working tool of claim 12, wherein the hydraulic chamber has a fill valve which is open while the piston moves opposite to the impact direction.

\* \* \* \* \*